United States Patent [19]

Chelminski

[11] 4,316,521
[45] Feb. 23, 1982

[54] PIVOTED ELEVATOR MOUNTING FOR MOBILE LAND SEISMIC ENERGY SOURCE

[75] Inventor: Stephen V. Chelminski, West Redding, Conn.

[73] Assignee: Bolt Associates, Inc., Norwalk, Conn.

[21] Appl. No.: 101,123

[22] Filed: Dec. 7, 1979

Related U.S. Application Data

[63] Continuation of Ser. No. 871,602, Jan. 23, 1978, abandoned.

[51] Int. Cl.³ .............................................. G01V 1/09
[52] U.S. Cl. .................................. 181/114; 181/119; 280/6.1
[58] Field of Search ...................... 181/114, 119, 121; 280/6.1, 6.11

[56] References Cited

U.S. PATENT DOCUMENTS

| | | | |
|---|---|---|---|
| 3,310,128 | 3/1967 | Chelminski | 181/114 |
| 3,550,719 | 12/1970 | Meister | 181/114 |
| 3,779,335 | 12/1973 | Chelminski | 181/119 |
| 3,800,907 | 4/1974 | Chelminski | 181/119 |
| 3,884,324 | 5/1975 | Hamilton et al. | 181/114 |
| 4,108,271 | 8/1978 | Chelminski | 181/119 |
| 4,116,300 | 9/1978 | Stone | 181/114 |

OTHER PUBLICATIONS

Brochure, "Par Air Gun", Bolt Associates, Norwalk, Conn., 1976.

*Primary Examiner*—Howard A. Birmiel
*Attorney, Agent, or Firm*—Parmelee, Johnson, Bollinger & Bramblett

[57] ABSTRACT

A seismic energy generating assembly includes a seismic energy generator positioned within a cage-like frame and adapted for vertical movement within the frame in reaction to the powerful seismic energy impulses that are transmitted downwardly into the earth. The assembly further includes hydraulic catch cylinders for easing the seismic energy generator back down to the ground within the frame after each impulse is generated. Horizontal extensions from this frame ride in guides formed by tubular channels for guiding the entire seismic energy generating assembly when lifted up from the ground by hydraulic lifting cylinders so that the assembly can be readily moved from place to place during seismic exploration. The tubular channels are pivotally mounted to an outer supporting frame on a land vehicle. The seismic energy generating assembly is thereby adapted for swinging movement with the tubular channels about a horizontal pivot axis passing through the assembly and extending transversely with respect to the vehicle for accommodating local variations, as encountered, in the slope of the earth's surface.

The horizontal extensions include tough, slippery plastic polymer sleeves at least partially surrounding vertical cylindrical mandrels which ride within the tubular channels. The tubular channels are pivotally mounted through spherical self-aligning bearings, and in this illustrative embodiment the swinging movement is limited to within approximately 10° from the vertical, but this limit may be more or less.

15 Claims, 11 Drawing Figures

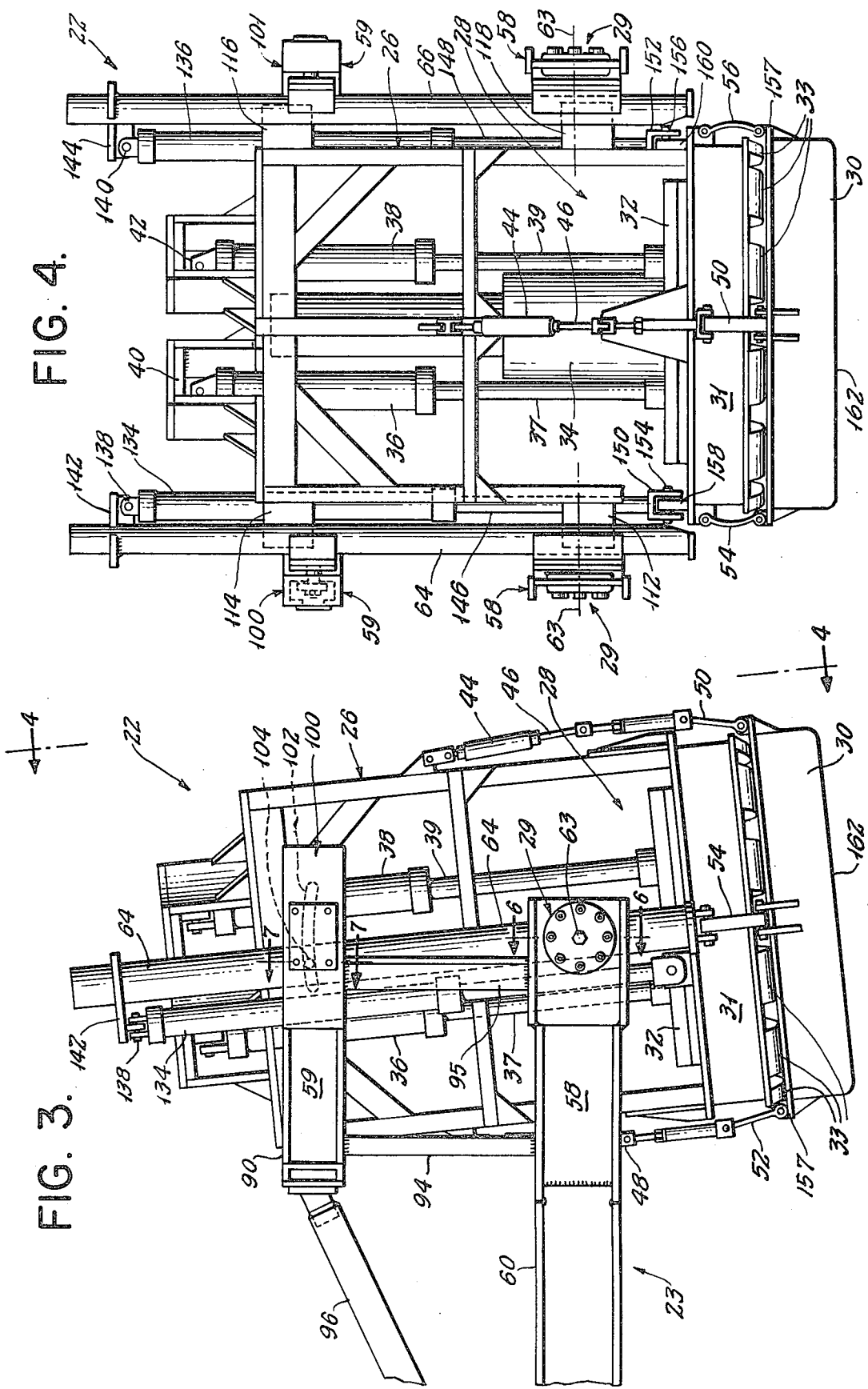

PIVOTED ELEVATOR MOUNTING FOR MOBILE LAND SEISMIC ENERGY SOURCE

This is a continuation of application Ser. No. 871,602 filed Jan. 23, 1978 now abandoned.

BACKGROUND OF THE INVENTION

The present invention relates to a land seismic energy source for seismic surveying or exploration on the earth and particularly to a pivoted elevator mounting for the generating assembly of such a land seismic energy source.

In seismic exploration on land, intense seismic impulses are transmitted down into the earth's surface at a desired site or grouping of sites, called the "shot point" or "shot points", and these impulses may be repeated at frequent intervals. A network of geophones is used to sense and to provide a recording of the results at various points spaced from the shot point or points at which the powerful sound impulses have been transmitted into the earth. These geophones are coupled to the earth for receiving the seismic energy which has been reflected and/or refracted by sub-surface geologic strata and various other sub-surface structures in the earth. Then the seismic energy generator equipment is raised from the surface of the earth and moved to the next shot point or group of shot points, and seismic impulses are then transmitted into the earth at the new shot point(s), and so on. In this manner, information is obtained about the conditions and characteristics of the geologic formations in the regions being surveyed. Such seismic surveying can be conducted on land, gravel, rocks, marshland, mud, sand, swamps or in shallow water where the land source can be positioned down against the earth.

Such land seismic energy sources have been constructed in compact and mobile form wherein the seismic energy generator includes a tank which may be in the shape of an inverted dome provided with a displaceable diaphragm bottom to enclose therein an incompressible liquid, such as water. One or more powerful gas-releasing airguns are positioned within the tank and receive and store pressurized air or other suitable gas under high pressure from a source of pressurized gas such as the high pressure receiver storage tank of a high pressure air-compressor. A metal pan is positioned between the diaphragm and the earth so that upon a very sudden or intensely abrupt release of the high-pressure gas into the liquid the flexible diaphragm suddenly thrusts down on the metal pan to displace a portion of the earth beneath the pan and thereby produce a powerful seismic impulse transmitted down into the earth.

In reaction to this transmission of a powerful seismic impulse, the seismic energy generator is forced away from the ground and, thus, seismic energy generating assemblies are generally constructed so that the energy generator is free to move within an assembly frame in reaction to transmission of the seismic impulse. Hydraulic catch cylinders are often provided to hold the energy generator away from the ground surface for a short period of time after the impulse is generated in order to avoid spurious seismic signals which would result if the energy generator were allowed to immediately fall back to its initial position.

Various lifting arrangements have been used to raise the seismic energy generator up from an operating position on the ground to an inoperative position for transport. Generally, in the prior art the seismic energy generator assembly is pivotally suspended from a supporting frame, and this supporting frame is swung upwardly along an arc to raise the seismic energy generator assembly.

Detailed information concerning prior mobile land seismic energy sources patented by the present inventor is disclosed in U.S. Pat. Nos. 3,800,907 issued Apr. 2, 1974; 3,779,335 issued Dec. 18, 1973; and 3,310,128 issued Mar. 21, 1967. A preferred generator assembly which may be used with the mounting apparatus of this invention is disclosed in an application Ser. No. 805,522, filed June 10, 1977, by the present inventor.

SUMMARY

It is among the advantages of this invention that it provides an elevator mounting for a seismic energy generating assembly which readily accommodates local variations in the slope of the earth's surface and enables powerful seismic energy impulses to be transmitted into the earth in spite of the fact that the generating assembly may be tipped away from vertical orientation.

It is among the further advantages of this invention in certain of its aspects that it provides an elevator mounting whereby the generating assembly may be easily placed on ground not level relative to the vehicle on which the generating assembly is mounted. Due to the ease with which the energy generating assembly can be set on unlevel ground and then used and then can be elevated for transport to the next shot point, an effective and efficient seismic surveying operation can be carried out by the survey crew.

According to certain aspects of the present invention, a mobile land seismic energy source for surveying on the earth by transmitting powerful seismic energy impulses into the earth includes vertical guide means for guiding a seismic energy generating assembly in vertical movement relative to an outer supporting frame attached to a land vehicle. The vertical guide means are pivotally mounted to the outer supporting frame for swinging movement about a generally horizontal axis. Elevator means are provided to lift the seismic energy generating assembly relative to the vertical guide means to lift the generating assembly from an operable position on the ground to an inoperable position above the ground in readiness for transport to a new shot point.

According to an other aspect of the invention, the vertical guide means include two rigid linear tubular channel members and said generating assembly includes horizontal extensions which fit into the tubular channel members in sliding engagement therewith. The extensions include tough, slippery plastic polymer sleeves at least partially surrounding vertical cylindrical mandrels positioned within and coaxial with the tubular channel members.

According to yet other aspects of the invention, the vertical guide means is pivotally mounted to an outer supporting frame by means of a spherical, self-aligning bearing, and means are provided for limiting the angular extent of the swinging movement of the vertical guide means.

According to a further aspect of the invention, the means for limiting the swing of the vertical guide means include first elements mounted on the vertical guide means and second elements mounted on the outer supporting frame cooperating with said first elements. These elements include low friction slide pads which prevent the vertical guide means from individually twisting about the spherical bearings. In one embodiment as shown, there is a horizontal extension from one of said vertical guide means and outer supporting frame and a member on the other of said vertical guide means and outer supporting frame. The member has an arcuate slot therein for receiving the extension. The extension moves along the slot with swinging movement of the vertical guide means but is stopped by the slot at the ends thereof to limit the extent of swing. In another embodiment as shown, a face plate provides a sliding track against which slide pads can travel in an arcuate path with stop means for limiting the arc of swinging motion.

According to another aspect of the invention, the generator assembly is pivotally connected to the outer supporting frame for swinging movement about a horizontal axis which passes generally through the center of gravity of the generating assembly. To this end, the outer supporting frame includes beams extending generally horizontally from the chassis frame of the vehicle.

Advantageously, the illustrative embodiment of this invention includes a support frame which supports the seismic energy generator assembly for swinging movement about a pivot axis extending transversely with respect to the transport vehicle. The lateral wheel or tread spacing of the vehicle is generally commensurate in size with the diameter of the "footprint" of the seismic impulse generator. Accordingly, the vehicle driver positions the vehicle with respect to the shot point, so that the lateral wheelbase location will achieve the requisite lateral tilting of the generator assembly to accommodate a ground slope in one geographic coordinate direction. Then, the transverse pivot axis accommodates localized ground slope in a second geographic coordinate direction perpendicular to the first. the support frame carries swing-limiting means for limiting the extent of swinging movement of the generator assembly about the transverse pivot axis.

Among the further advantages of the pivot elevator mounting embodying this invention is that it enables the seismic energy generator assembly to be reliably operated for transmitting the desired strong seismic energy impulses into the earth even when the generator assembly is simultaneously tilted in two directions, i.e. upon terrain having a dual slope. It enables the generator assembly to be pressed down firmly flush against the earth surface in spite of the fact that the earth surface may be sloped in two geographic coordinate directions at the shot point. Consequently, an exploration crew is enabled to carry out a seismic survey along a predetermined map line with intended shot points at uniformly spaced increments along that line in spite of irregularities in slopings of the earth surface which are encountered as the crew proceeds with its task. An accurate and reliable survey operation thereby is produced, because the actual shot points, as made by the crew are located in accordance with a predetermined program where these shot points were intended to be located.

In other words, the survey crew becomes encouraged to proceed in accordance with the predetermined survey program rather than making spur of the moment deviations to avoid difficult local terrain slopes.

The fact that the pivoted elevator mounting embodying this invention enables the seismic energy generator to be conveniently and reliably operated in difficult terrain is even more advantageous and important than might at first appear. There are two new techniques in land seismic surveying which are to be considered: (1) The most recent land seismic survey programs are likely to specify that a relatively great number of individual "pops", i.e. seismic energy impulses, are to be transmitted by each seismic energy generator per mile of travel. For example, the survey program may specify the order of 500 "pops" per seismic energy generator per mile. If a survey crew is using three survey vehicles in a predetermined array, such a schedule means that the crew will be called upon to produce 1,500 "pops" per mile of survey. Moreover, each "pop" is to be transmitted from a precisely predetermined geographic coordinate location in order that the resultant data collected will appropriately and meaningfully match with the subsequent computer processing intended to be carried out. (2) In addition, digital processing of the data being collected may be carried out in the field as the survey itself is progressing. Suitable portable microprocessors are now available for such field processing. This field processing of data as a survey progresses enables the person in charge to make strategic decisions based upon what is being learned. These strategic decisions may involve parameters such as the spacing between shot points and the array of shot points, the number of "pops" to be produced at each shot point, and the arrangement of geophones. Changes in these parameters may be decided upon in order to enhance the data in view of peculiarities in sub-surface geologic structures.

Consequently, the accuracy in the geographic location of each shot point is tremendously important in optimizing the effectiveness of the seismic survey campaign. Now, when it is considered that as may as 500 "pops" per vehicle per mile are being produced, it will be understood that the real convenience and reliability in operation irrespective of difficult terrain afforded by employing the present invention are of crucial importance in practicable accomplishment of the surveying objectives.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is an enlarged side elevational view of the energy generating assembly and support frame of FIG. 1;

FIG. 4 is a rear elevational view of the generating assembly and support frame of FIG. 3 as seen from the position 4—4 in FIG. 3, and with the generating assembly shown in a level position;

FIG. 6 is a section taken along the line 6—6 in FIG. 3 and shown greatly enlarged;

FIG. 8 is a section taken along the line 8—8 in FIG. 5 and shown greatly enlarged;

DETAILED DESCRIPTION

Figure 1:
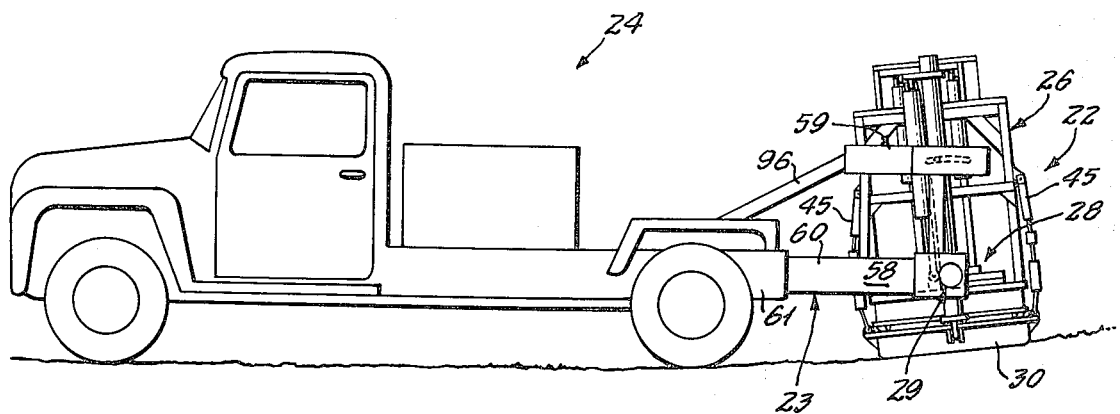
FIG. 1 is a side elevational view of a mobile land seismic energy source including the improved elevator mounting embodying the present invention. In this view, the seismic energy generating assembly is set against a site on the ground which has an uphill inclination from the vehicle.
Figure 2:
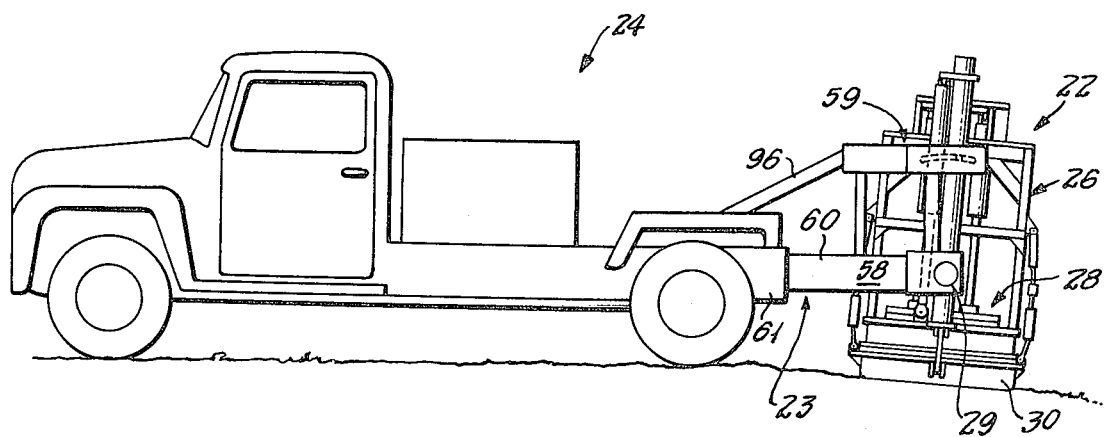
FIG. 2 is a view similar to that of FIG. 1 but showing the seismic energy generating assembly set against a site having a downhill inclination.

As may be seen in FIGS. 1 and 2, a seismic energy generating assembly for generating the transmitting into the earth strong seismic energy impulses is indicated generally at 22. The generating assembly 22 is shown positioned upon the surface of the earth and is supported by an outer supporting frame shown generally at 23. This supporting frame 23 is attached to a conventional land vehicle 24. Such a conventional land vehicle 24 may be a truck, a log skidder, a tractor, a vehicle with revolving treads, and so forth, depending upon the type of terrain to be explored. The seismic energy generating assembly 22 includes an inner cage-like frame 26 with a seismic energy generator 28 supported therein. The seismic energy generator 28 includes a steel pan 30 which is positioned on the earth surface when a seismic impulse is to be generated and transmitted down into the earth.

As can be seen in FIG. 1, the elevator mounting of the present invention is swingable about pivot bearings 29 carried by the supporting frame 23 so that the orientation of the generating assembly as a whole is adapted to conform with local variations in the slope of the earth surface. Thus, the metal pan 30 can be seated down flush, even against a surface which is inclined relative to the vehicle. As shown in FIG. 2, the pivoted elevator mounting is also adapted to conform to a local region of the earth surface which slopes downwardly relative to the vehicle.

The seismic energy generating assembly 22 is more clearly shown in the enlarged views of FIGS. 3 and 4. The inner cage-like frame 26 includes a lower circular portion 31 having resilient bumper elements 33 extending downwardly therefrom which are shown pressing down against the upper rim of the pan 30. With the generating assembly 22 in the operating position as shown the cage-like frame 26 presses the pan 30 down against the earth.

It has been noted that when a strong seismic impulse is transmitted into the earth, the generator 28 is suddenly forced upwardly in a reaction as the pan 30 is forced downwardly in a sudden powerful impulse. To reduce the upward reaction movement of the generator and to increase the magnitude of the seismic impulse, weights 32 are rigidly attached to the generator. As described in U.S. Pat. No. 3,779,335 and in application Ser. No. 805,522, referred to above, a water/air separator 34 is provided to separate the air which has been discharged by the airgun or airguns (not shown) from the water in the confining tank of the generator (not shown) so that this discharged air can then be released into the atmosphere.

When a seismic impulse is generated, the generator 28 suddenly moves upwardly along with its weights 32. Once the energy generator 28 has reached the upper limit of its movement in reaction to the seismic impulse, hydraulic catch cylinders 36 and 38 having check valves associated therewith prevent the generator from crashing down. Associated hydraulic circuits are arranged to lower the generator down gently into its original position with the pan against the earth in readiness to transmit another impulse into the earth. For information about the appropriate hydraulic circuit arrangement, the reader may see U.S. Pat. No. 3,779,335 referred to above. The hydraulic cylinders 36 and 38 have their upper ends attached by respective self-aligning connections 40 and 42 at the top of the cage-like frame 26, and similar self-aligning connections are provided for attaching the bottom ends of the piston rods 37 and 39 extending from cylinders 36 and 38.

In order to prevent tilting of the pan 30 into a misaligned position prior to firing, a plurality of pneumatic pull-up cylinders 44 and 45 may be provided as described and claimed in said application, Ser. No. 805,522. The upper end of each cylinder is secured to the cage-like frame 26. Respective piston rods 46 and 48 are connected to the pan 30 by pull-up connecting links 50 and 52. A flexible high pressure hose line (not shown) feeds compressed air into each pull-up cylinder beneath the piston therein for exerting a forceful upward pull on the perimeter of the pan to hold the pan against the bumpers 33 prior to firing of the airgun(s). Thus, if the operator inadvertently places the pan 30 of the land seismic energy source down on the ground with a rock or the like eccentrically located under the bottom of the pan, the upward pull of the connecting links 50 and 52 prevents the pan from tilting relative to the rest of the seismic energy generator prior to firing. After firing of the airgun(s), downward motion of the pan 30 is permitted by extension of the piston rods 46 and 48.

During transport from one shot point to the next shot point, the generator assembly 22 is elevated from the surface of the earth as will be explained later. The generator 28 is then supported by the piston rods 37 and 39 which become fully extended from cylinders 36 and 38, and the pan 30 is held up by a plurality of flexible, stretchable curved holdup straps 54 and 56. These holdup straps are sufficiently flexible and stretchable to permit downward movement of the pan 30 during transmission of a seismic impulse into the earth. Also, they are slack and assume a bowed configuration, as seen in FIG. 4, when the pan 30 is being pressed against the earth before the generator 28 is actuated (fired).

If desired, the pull-up cylinders 44 and 45 and connecting links 50 and 52 may be omitted, if the total number of holdup straps 54 and 56 is increased, for example, to six or eight in number.

The supporting frame 23 includes a main lower yoke structure 58 (FIGS. 3, 4 and 5) and an upper yoke structure 59. The pivot bearing assemblies 29, discussed above, are mounted on the lower yoke structure, as will be explained later, and they define a horizontal pivot axis 63 about which the seismic energy generating assembly 22 can swing. The upper yoke structure 59 includes means for limiting the extent of swinging movement as will be explained.

Instead of forming the supporting frame 23 to include lower and upper yoke structures 58 and 59, these two yoke structures can be integraged into a single yoke structure as explained below.

Figure 5:
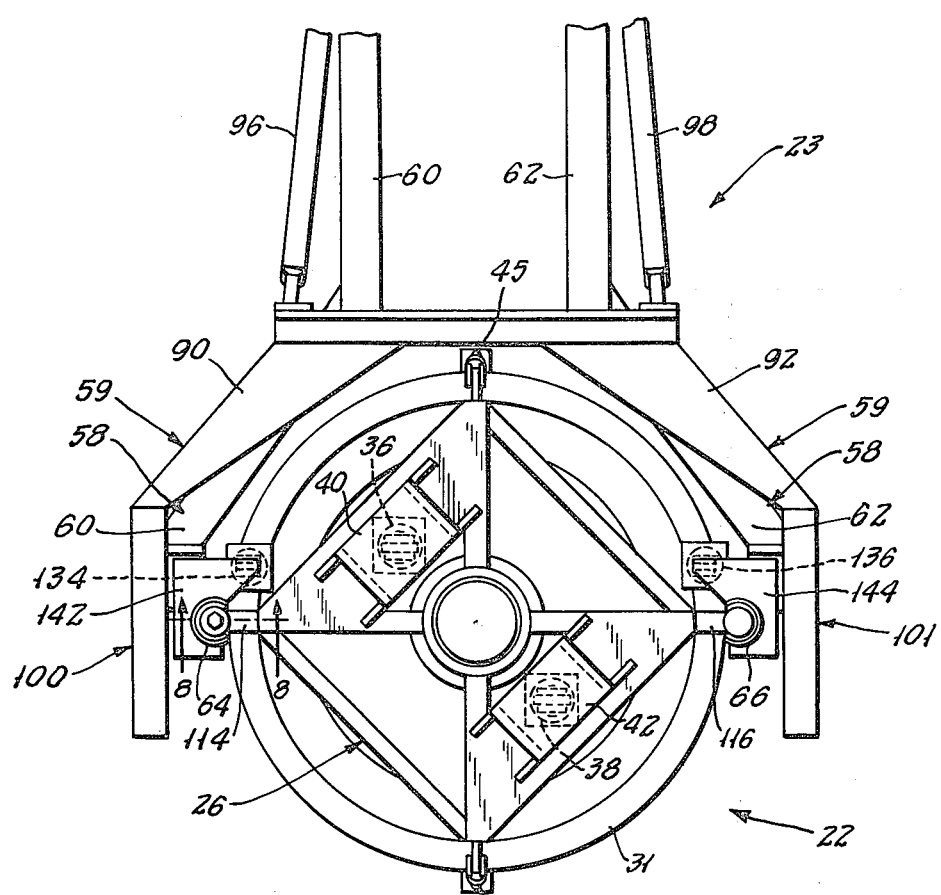
FIG. 5 is a top plan view of the energy generating assembly and supporting frame of FIG. 4.

As seen in plan view in FIG. 5, the lower and upper yoke structures 58 and 59 each has a generally U-shaped configuration and partially encircles the seismic energy generating assembly 22. The lower yoke structure 58 provides the main support for the seismic energy generating assembly 22 and includes a pair of beams 60 and 62 which extend generally horizontally from the rear of the chassis frame 61 (FIGS. 1 and 2) of the land vehicle 24. The seismic energy generating assembly can be elevated along vertical guide means which include long upright channel members 64 and 66 (FIGS. 3, 4 and 5). These channel members (one of which is also seen in FIGS. 6, 7, 8 and 9) are tubular members, each having a vertical, longitudinal opening therein facing inward toward the seismic energy generating assembly 22. These channel members are pivotally mounted to the outer supporting beams 60 and 62 by the pivot bearing assemblies 29, so that the generating assembly with its vertical guide means can swing about a horizontal pivot axis 63 for accommodating various localized slopes of the earth surface, as discussed above.

Figure 6:
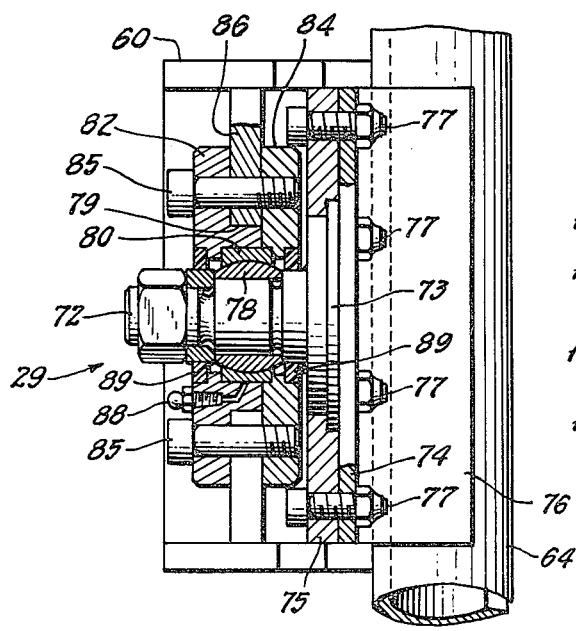
FIG. 6 is a rear elevational view, with a portion thereof in section, of the pivot mounting of FIGS. 3 and 4.

One of the two pivot bearing assemblies 29 for pivotally mounting the tubular channel members 64 and 68 onto the support beams 60 and 62 of the lower yoke structure 58 is best shown in FIG. 6. A pivot pin 72 has a large flange 73 and is mounted to a plate 74 which is welded onto a short length of channel 76. This channel 76 is fitted onto the tubular channel member 64 like a saddle and is welded thereto. This pivot pin 72 with its flange 73 is secured to the plate 74 by a retainer 75 held by bolts 77. This pivot pin 72 supports a commercially available spherical self-aligning bearing element 78 within a concave bushing 80. The bushing 80 is centered in a clearance opening 79 formed in the web 86 of beam 60 and is held in place by an opposed pair of clamping plates 82 and 84 which are bolted together by a plurality of bolts 85 passing through the web 86. The bushing 80 is a hardened steel and this bearing may be lubricated through a grease fitting 88. To prevent loss of grease, plastic seals 89 are provided.

In addition to the main beams 60 and 62 of the lower yoke structure 58, the supporting frame 23 includes the upper yoke structure 59, discussed above, including upper beams 90 and 92 as shown in FIGS. 3, 4 and 5. The upper and lower yoke structures 58 and 59 are rigidly held together by an upright frame plate 94 and by upright struts 95 on each side (only one can be seen in FIG. 3). The upper yoke structure 59 is further secured to the vehicle by rigid diagonal struts 96 and 98, which are tubular in form.

As mentioned above, the two yokes 58 and 59 of the supporting frame 23 can be integrated into a single yoke structure. This integral yoke 58 and 59 is made by replacing the upright side struts 95 with relatively large area side plates (not shown) which are welded in place extending between the upper and lower beams 90 and 60 and 92 and 62, respectively. Moreover, by extending these two side plates forwardly sufficiently far along the lower beams 60 and 62 and by shaping the front edge of each plate to slope upwardly and back in the manner of a gusset, then these two side plates may also serve to replace the diagonal struts 96 and 98.

In order to limit the possible swing of the seismic energy generating assembly 22 about the horizontal pivot axis 63, a pair of similar swing limiting means 100 and 101 (FIGS. 3, 4 and 7) are provided on the beams 90 and 92, respectively, of the upper yoke structure 59. As shown in FIG. 3, an arcuate slot 102 is formed in the inner vertical web 99 of the box beam 90, and a pin 104, fixed to the tubular channel member 64, travels in this arcuate slot. This slot 102 is defined by a segment of a circle centered at the pivot axis 63. The pin 104 travels along the slot with swinging of the generating assembly 22 but is stopped by the ends of the slot. In this example, the ends of this arcuate slot are positioned at an angle of 10° forward and aft of a vertical line passing through the pivot axis 63, thus determining a swing limit of 10° either way of the generator assembly 22 relative to the support frame 23, but a greater or lesser swing limit may be provided, if desired.

Figure 7:
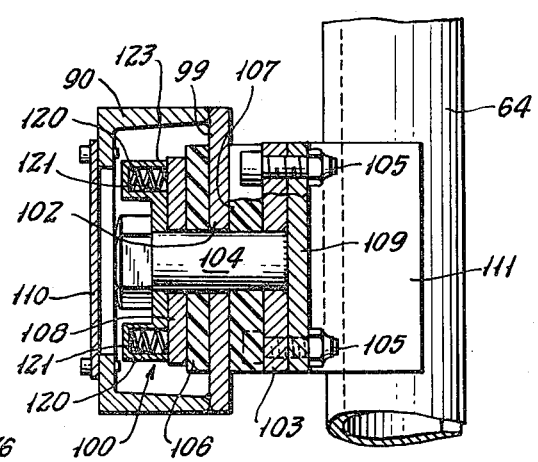
FIG. 7 is a rear elevational sectional view of the swing limiting means of FIGS. 3 and 4, being a section taken along the line 7-7 in FIG. 3 and shown greatly enlarged.
Figure 9:
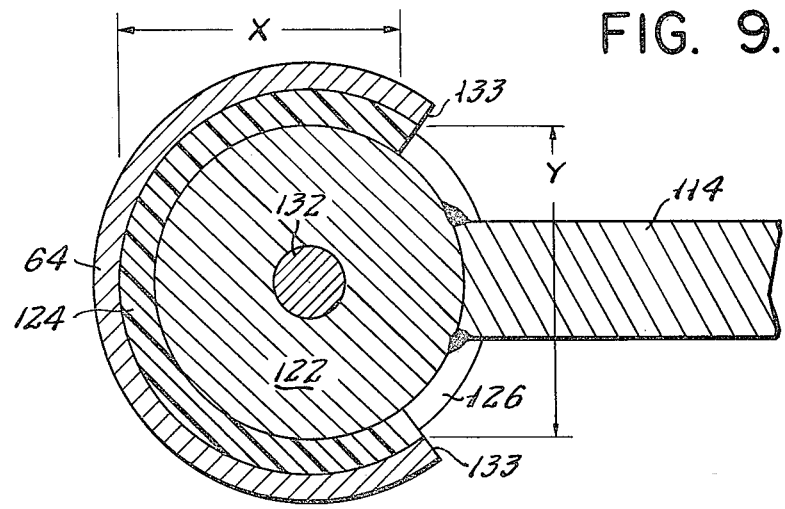
FIG. 9 is a top sectional view of the lift guide extension and tubular guide channel taken along line 9—9 in FIG. 8.
Figure 8:
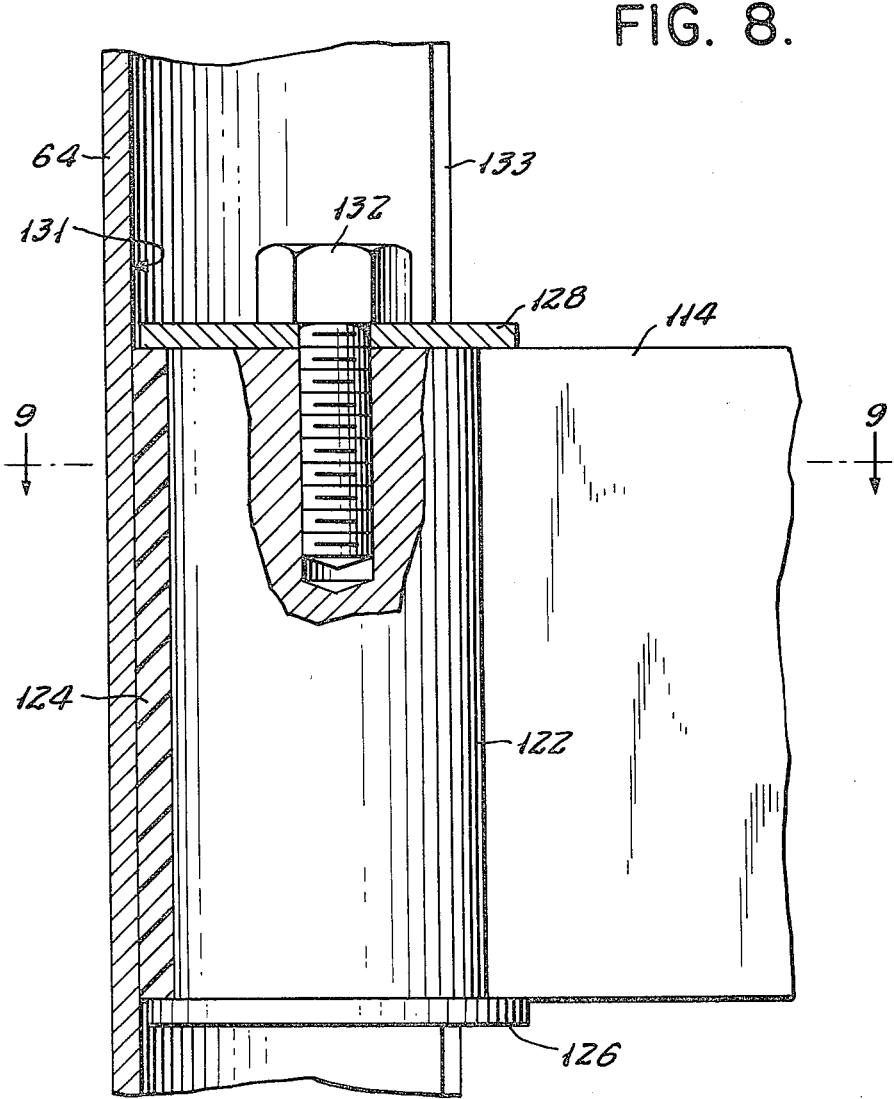
FIG. 8 is a rear sectional, elevational view of a lift guide extension from the cage-like frame positioned within the tubular guide channel.

A sectional view of the swing limiting means 100 is shown in FIG. 7. The pin 104 is welded to a plate 103 which is secured by bolts 105 to a mounting plate 109 welded onto a channel 111 which is welded to the tubular channel member 64. The swing limiting pin 104 extends outwardly through the slot 102. The web 99 serves as a vertical slide plate extending fore and aft, and near the slot 102 it is straddled by a pair of tough, slippery plastic slide pads 106 and 107, for example, of high molecular weight polyethylene. A large steel washer 108 carried by the pin 104 is held against the outer slide pad 106. These slide pads, being of tough, slippery material, offer little resistance to swinging of the generator assembly even with a tight sliding fit. To provide access to the pin 104 and arcuate slot 102, a removable cover plate 110 is fastened over an opening in the outer vertical web of the box beam 90.

In order to prevent the tubular guide 64 from turning into a misaligned position about its own axis, as might otherwise occur due to the spherical bearing assembly 29 (FIG. 6), the slide pads 106 and 107 are pressed firmly against the vertical web plate 99. To exert a continuing firm pressure by both slide pads 106 and 107, a plurality of powerful springs 120 thrust against the large washer 108. These springs 120 are mounted in sockets 121 in a spring retainer 123 held in place by a nut on the pin 104.

In order to enable the seismic energy generating assembly 22 to be elevated, it is mounted to the tubular vertical guide means 64 and 66 by means of horizontal extension arms 112, 114, 116 and 118 (FIG. 4) from the cage-like frame 26. As seen in plan view in FIG. 5, the upper pair of extension arms 114 and 116 project through the longitudinal openings in the tubular guide channels 64 and 66, and the lower pair of extensions 112 and 114 are similarly aranged. One of these extensions and the tubular guide channel are shown in detail in FIGS. 8 and 9.

An arm 114 extends from the cage-like frame 26 and has a cylindrical metal mandrel 122 secured thereto as by welding. The mandrel is positioned within and is coaxial with the tubular lift guide channel member 64. A plastic sleeve 124 of tough, slippery plastic, for example, high molecular weight polyethylene or Nylon, is wrapped around the mandrel 122 and is supported on a bottom shoulder 126 of the mandrel. The plastic sleeve is retained on the mandrel by a washer 128 and a bolt 132 screwed into the mandrel. Because the plastic sleeve is a tough, slippery polymer and is a good bearing material, the above assembly, when positioned within the guide channel 131 of the tubular member 64, provides a good sliding fit and does not interfere with elevation of the generator assembly 22 along the guide channel 131. The longitudinal opening in the guide member 14 is shown at 133 in FIG. 9.

The plastic sleeve 124 is exceptionally durable. However, if replacement becomes necessary, the washer 128 can be easily removed to permit convenient removal of the worn sleeve. Although the plastic sleeve 124 has a larger diameter than the width of the slot 133, this sleeve can be removed through the slot 133. This removal is accomplished by first moving the sleeve 124 upwardly along the lift guide channel 131 until the sleeve 124 is above the top of the mandrel 122. Then the sleeve 124 can be rotated 90° and removed out through the slot 133. The width of the sleeve 124 in the direction X is less than the width Y of the opening 133, and so when the sleeve is turned 90°, it can be readily removed. A new sleeve can then be inserted into the channel 131 through the slot 133 and turned 90° into correct alignment. This new sleeve may then be slid downwardly in the guide channel 131 into position around the mandrel 122. Thus, there is advantageously no requirement for the replacement of expensive metal parts having close tolerances.

In order to elevate and to lower the generator assembly 22 along the guide means 64 and 66, a pair of hydraulic lift and lowering cylinders 134 and 136 (FIGS. 3, 4 and 5) are provided. These cylinders are connected by means of clevis pivots 138 and 140 to brackets 142 and 144 secured to the upper ends of the guide channel members 64 and 66, respectively. The respective piston rods 146 and 148 extend downwardly and have clevises 150 and 152 fixed to the ends thereof. The piston rods are attached by means of clevis pins 154 and 156 to brackets 158 and 160 on the lower circular portion 31 of the cage-like frame 26. By retracting the piston rods 146, 148 into the cylinders 134 and 136, the cage-like frame 26 and thus the entire seismic energy generator 28 is elevated along the lift guide channel members 64 and 66. By reversing the action of the lift cylinders 136, 138, the piston rods 146, 148 are extended for lowering the frame 26 and generator 28. The bumpers 33 become pressed down onto the rim 157 of the pan 30 for pressing it down forcefully against the ground.

In operation, the seismic energy generating assembly 22 is transported to the surveying location in an elevated position by the land vehicle 24. The piston rods 146 and 148 are completely retracted, thereby holding the cage-like frame 26 in the elevated position as guided by the extension arms 112, 114, 116 and 118. At the surveying site or "shot point" the vehicle 24 is positioned so that the pan 30 can be seated down firmly flat against the earth surface with angular adjustment only about the horizontal pivot axis 63. This firm seating of the pan 30 flat against the surface of the earth in spite of local slope inclinations is advantageously accomplished since the lateral wheel spacing of the vehicle 24 is hardly wider than the generating assembly. Thus, the driver positions the parked vehicle 24 so that its lateral tilting provides the necessary lateral tilting of the seismic energy generating assembly 22.

It is to be noted that the horizontal pivot axis 63 extends transversely; in other words it extends parallel with the direction of the axles of the vehicle, which is the direction of the lateral wheel spacing. This lateral wheel spacing may be called the "lateral wheelbase", and it is generally commensurate in size with the diameter of the "footprint" of the seismic impulse generator (area of contact of the pan 30 on the ground). The lateral wheelbase is much smaller than the longitudinal wheelbase of the vehicle as determined by the spacing between the forward-most and rearwardmost axle of the vehicle. Accordingly, the driver positions the vehicle so that the lateral wheelbase location will achieve the requisite lateral tilting of the generator assembly 22 to accommodate ground slope in one coordinate direction for the pan 30 to seat flush onto the earth surface at the shot point. With the vehicle thus positioned, the piston rods 146 and 148 are extended to lower the seismic energy generating assembly 22, including the cage-like frame 26 and the seismic energy generator 28, until the pan 30 is pressed down by the resilient bumpers 33 flush against the earth surface. Where the surface at the shot point is inclined upwardly from the longitudinal wheelbase of the vehicle 24 as shown in FIG. 1, the vehicle may be moved slightly forward as the pan 30 is set on the ground. As the pivot axis 63 moves forward the assembly automatically pivots so that the pan 30 quickly rests flush against the earth surface.

For a downward slope of the shot point surface relative to the longitudinal wheelbase of the vehicle as in FIG. 2, the vehicle 24 may be moved slightly in reverse as the pan 30 is set on the ground so that the assembly pivots to the position shown.

In summary, the positioning of the lateral wheel-base accommodates ground slope in one geographic coordinate direction, and the transverse pivot axis 63 then accommodates localized ground slope in the other geographic coordinate direction perpendicular to the first.

In order to reduce the amount of forward and reverse movement of the vehicle in setting the pan 30 flush against the earth surface, it is preferred that there be a low pivot axis for the generator assembly generally passing through its center of gravity. For a given angular adjustment, the required fore and aft movement of the vehicle is reduced by lowering the pivot axis. The extent of horizontal compensation required can be seen to be the sine of the angle of adjustment, times the distance between the pivot axis 63 and the bottom surface of pan 30. By lowering the pivot axis, this distance and thus the required horizontal compensation is reduced.

Although for the above reasons it is preferred that a low pivot axis 63 be provided, it is best that this axis not be below the center of gravity of the seismic energy generating assembly 22 when this whole assembly is in its most elevated position. If the axis were below the center of gravity, the assembly would tend to be top heavy and awkward to handle. Thus, the pivot axis 63 should be at about or slightly above the center of gravity of the elevated assembly 22 but not below that center of gravity.

The seismic energy generator assembly can be reliably operated for transmitting intense seismic energy impulses into the earth even when it is simultaneously tilted in two geographic directions, that is upon terrain having dual slopes. The bottom diaphragm surface 162 of the pan 30 of the seismic impulse generator is enabled to be pressed down forcefully flush against the earth's surface by the lift cylinders 134, 136 in spite of the fact that the ground may be sloped in two geographic coordinate directions at the shot point, thereby achieving good coupling with the earth's surface, so as to be able reliably to transmit strong seismic impulses down into the earth.

Figure 10:
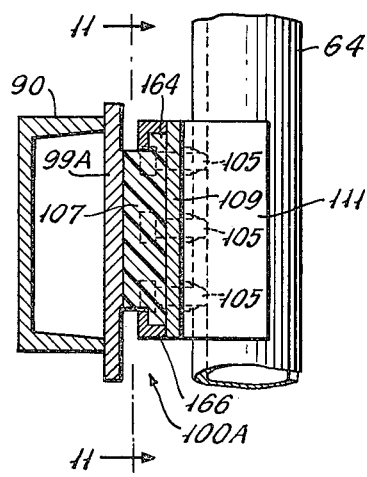
FIG. 10 is a rear elevational sectional view, similar to FIG. 7, and showing a modified embodiment of the swing limiting means.
Figure 11:
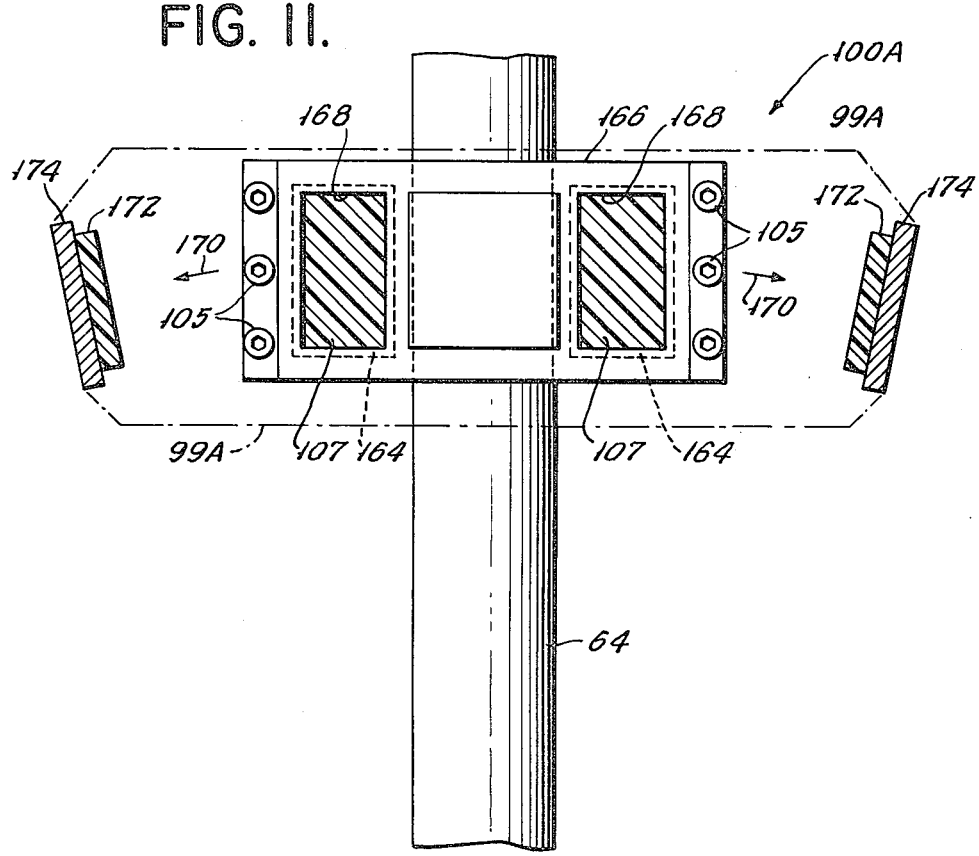
FIG. 11 is a side elevational sectional view taken along the line 11—11 in FIG. 10.

FIGS. 10 and 11 show an alternative swing-limiting means 100A, and a similar swing-limiting means may be used on the opposite side of the seismic energy generating assembly 22. The upper beam portion 90 of the supporting frame 23 has a vertical slide plate 99A mounted thereon. This slide plate 99 extends in a fore and aft direction. In FIG. 11, this slide plate 99A is shown in dash and dotted outline because it is out of the plane of the section 11—11.

Welded to the tubular lift guide member 64 is a short channel 111 having a mounting plate 109 welded thereto. A pair of slide pads 107 of tough slippery plastic, such as high molecular weight polyethylene are mounted on the mounting plate 109. Each pad 107 has a flange 164 extending around it, and a retainer member 166 overlaps and engages the flanges 164 to hold these pads in place. This retainer 166 has a pair of rectangular openings 168 (FIG. 11) through which the pair of slide pads 107 can protrude into contact with the slide plate 99A. A plurality of bolts 105 at each end secure this retainer to the mounting plate 109.

As indicated by the arrows 170 in FIG. 11, the tubular lift guide member 64 together with its slide pad swing-limiting assembly 100A can swing back and forth. The pads 107 slide along an arcuate path against the inside face of the slide plate 99A. For limiting the extent of this swinging movement, there are resilient bumpers 172 mounted on brackets 174 at each end of the slide plate 99A. In this example, the limit of swing is approximately 10° fore and aft of vertical, but may be made more or less, as desired, depending upon the overall length of the slide plate 99A.

This pair of slide pads 107 are spaced apart in the fore and aft direction, and they bear firmly against the slide plate 99A in sliding relationship therewith. They thereby prevent the tubular guide member 64 from turning into a misaligned position about its own axis as might otherwise occur due to the spherical bearing assembly 29 (FIG. 6).

In other words, the pair of spaced slide pads 107 in FIG. 11 engaging firmly against one side of the slide plate 99A stabilize the tubular lift guide member 64 against twisting about its own axis. Similarly, in FIG. 7 the relatively wide pair of slide pads 107 and 106 firmly engaging opposite faces of the slide plate 99 in sandwich relationship stabilize the tubular lift guide member 64 against twisting about its own axis. It is to be understood that the two slide pads 107 in FIG. 11 could be replaced by one large slide pad having sufficient size to provide the desired stabilization.

In FIGS. 1 and 2, the support frame 23 is shown cantilevered from the rear of a vehicle 24. In other words, the seismic energy generating assembly 22 is in an "outboard" position.

It is to be understood that land seismic survey vehicles can be constructed having a large clearance opening within the chassis between the front and rear wheels for receiving a seismic energy generating assembly "inboard" within such a clearance opening, for example, as shown in my earlier U.S. Pat. No. 3,310,128 to which reference has been made. Accordingly, it is to be understood that the support frame 23 can be arranged to support the seismic energy generating assembly 22 inboard within a large clearance opening in the chassis of a vehicle between the front and rear wheels. In such a case, the main side beams 60 and 62 are mounted to the chassis frame near the large clearance opening in the chassis where the seismic energy generating assembly is located, and the pivot axis 63 (FIG. 4) extends transversely with respect to the vehicle.

In the event that the chassis of the vehicle is designed so that it includes two main beams spaced apart an appropriate distance and located at an appropriate height above the ground, then portions of such chassis beams may directly support the bearing assemblies 29, as shown in FIG. 6, by forming a hole 80 in the web of such chassis beam. The swing-limiting means, such as in FIG. 7 or in FIGS. 10 and 11, are secured to a supporting frame which is similar to the frame 23 and which extends above the chassis of the vehicle on either side of the inboard mounted seismic energy generator assembly 22.

The operation of such an inboard mounted seismic energy generating assembly 22 is the same as described above and is convenient and reliable as described above. Lateral sloping of the ground is accommodated by lateral tilt of the whole vehicle together with the assembly 22, while any fore and aft sloping of the ground at the shot point is accommodated by swinging movement about the transverse pivot axis 63, the same as described for the outboard mounted assembly 22.

As a result of the convenient and reliable operating characteristics, an exploration crew is enabled to carry out a seismic survey along a predetermined map line with intended shot points at uniformly spaced increments along that line in spite of difficult irregularities and dual slopes in the earth's surface which are encountered at the successive intended shot points as the crew moves ahead with its project. An accurate and reliable survey operation is thereby produced, i.e. reliable data is collected. The actual shot points as made by the crew will correspond with those shot points which were laid out on the map in accordance with a predetermined survey program. The crew is encouraged to proceed in accordance with the predetermined survey program rather than making spur of the moment local deviations to avoid difficult terrain slopes as encountered. Irrespective of difficult terrain, the seismic surveying objectives are enabled to be accomplished effectively and efficiently.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. In a mobile land seismic energy source for surveying on the earth by transmitting powerful seismic energy impulses down into the earth wherein a seismic energy generator is movable upwardly within a cage-like frame in reaction to the transmission of a powerful seismic energy impulse into the earth and can be lowered downwardly within said cage-like frame in readiness for transmission of the next powerful seismic impulse and the generator has a relatively large area bottom intended to be seated down flush against the earth surface for providing a relatively large area of firm contact with the earth surface for achieving good coupling with the earth to transmit such powerful seismic impulses into the earth and the cage-like frame is supportable from a vehicle so that the cage-like frame and generator can be raised away from the earth surface for transport, improved mounting apparatus comprising:

a supporting frame means adapted for mounting to a vehicle, said supporting frame means extending on opposite sides of said cage-like frame;

elevator means connected to opposite sides of said cage-like frame for lifting and lowering said cage-like frame for raising said frame and said seismic energy generator away from the earth surface and for pressing said bottom down forcefully against the earth surface;

a pair of bearing assemblies mounted on said supporting frame means respectively on opposite side of said cage-like frame and each connected to said elevator means for defining a pivot axis extending transversely with respect to the vehicle about which said elevator means, said cage-like frame and said seismic energy generator can swing fore and aft as an assembly with respect to the vehicle; and swing-limiting means associated with said supporting frame means and coupled to said assembly for limiting the amount of swinging movement thereof about said transversely extending axis;

said swing-limiting means including an upper portion of said supporting frame means also extending on opposite sides of said cage-like frame;

a pair of members mounted on said upper portion of said supporting frame means on opposite sides thereof each providing for a predetermined limited arcuate path of movement concentric about said pivot axis; and a pair of parallel upright guides being coupled to said pair of members, respectively, for limiting the swing of said assembly fore and aft with respect to the vehicle;

whereby a survey crew using said mobile land seismic energy source can conveniently transport said source from shot point to shot point and can reliably press the bottom down firmly and flush against the earth surface for achieving good coupling with the earth regardless of the fact that the earth surface may be sloped in two geographic coordinate directions at the shot point and can reliably operate the seismic energy source even when it is simultaneously tilted in two directions at such a shot point.

2. A mobile land seismic energy source for surveying on the earth by transmitting powerful seismic energy impulses down into the earth, said land source comprising:

a seismic energy generating assembly including a seismic energy generator for generating a seismic impulse;

an outer supporting frame adapted for mounting on a land vehicle;

vertical guide means for guiding said generating assembly in vertical movement relative to said outer supporting frame;

said vertical guide means being pivotally mounted to said outer supporting frame for swinging movement about a generally horizontal axis;

said vertical guide means comprising two rigid, linear tubular channel members each having a longitudinal opening therein facing inwardly toward said seismic energy generating assembly, said seismic energy generating assembly including horizontal extensions which fit into said tubular channel members and are free to move longitudinally along within said channel members, said horizontal extensions from said generating assembly extending through said longitudinal openings, said extensions including tough, slippery plastic polymer sleeves at least partially surrounding vertical cylindrical mandrels positioned within and coaxial with said tubular channel members; and lifting means for lifting said generating assembly relative to said vertical guide means to elevate said seismic energy generating assembly from an operating position in contact with the ground to a raised position above the ground in readiness for transport.

3. A mobile land seismic energy source for surveying on the earth by transmitting powerful seismic energy impulses down into the earth, said land source comprising:

a seismic energy generating assembly including a seismic energy generator for generating a seismic impulse;

an outer supporting frame adapted for mounting on a land vehicle;

a vertical guide means for guiding said generating assembly in vertical movement relative to said outer supporting frame;

said vertical guide means being pivotally mounted to said outer supporting frame for swinging movement about a generally horizontal axis;

means for limiting the angular extent of said swinging movement of said vertical guide means, including a pin extending horizontally from one of said vertical guide means and said outer supporting frame, and a member on the other of said vertical guide means and outer supporting frame, said member defining an arcuate slot for receiving said pin, said pin being movable along said slot with swinging movement of said vertical guide means but being stopped by the ends of said slot for limiting the extent of the swinging movement of said vertical guide means; and lifting means for lifting said generating assembly relative to said vertical guide means to elevate said seismic energy generating assembly from an operating position in contact with the ground to a raised position above the ground in readiness for transport.

4. An elevator mounting for mounting a land seismic energy source to a land vehicle, said land seismic energy source being of the type having a seismic energy generating assembly including a seismic energy generator for generating a seismic energy impulse, said generator being supported in a cage-like frame and being adapted for vertical movement within said cage-like frame in reaction to transmission of a powerful seismic energy impulse down into the earth, said elevator mounting comprising:

an outer supporting frame adapted for mounting on said land vehicle;

vertical guide means for guiding said cage-like frame in vertical movement relative to said outer supporting frame;

said vertical guide means being pivotally mounted to said outer supporting frame for swinging movement about a horizontal axis extending transversely with respect to the vehicle for accommodating ground surface sloping fore and aft with respect to the vehicle;

means for limiting the angular extent of said swinging movement of said vertical guide means including:

an element extending from one of said vertical guide means and said outer supporting frame, and a member on the other of said vertical guide means and outer supporting frame, said member defining an arcuate slot for receiving said extending element, said element being movable along said slot with swinging movement of said vertical guide means but being stopped by the ends of said slot for limiting the extent of swing of said vertical guide means; and lifting means connected to said cage-like frame for lifting said cage-like frame along a straight path parallel with said vertical guide means to move said seismic energy generating assembly from an operating position in contact with the ground to an elevated position above the ground in readiness for transport, said lifting means also lowering said cage-like frame along a straight path parallel with said pivotally mounted vertical guide means for moving said cage-like frame down straight parallel with said vertical guide means even when said vertical guide means is swung into a tipped position for accommodating such sloping ground surface, whereby said elevator mounting enables convenient lifting of said seismic energy generating assembly for transport from shot point to shot point and enables the pressing of said seismic energy generating assembly flush down against ground surface sloping fore and aft with respect to said land vehicle.

5. A mobile land seismic energy source for surveying on the earth by transmitting seismic energy impulses into the earth, said land source comprising:

a seismic energy generating assembly including a seismic energy generator for generating a seismic impulse, said generator being movably supported in a first frame for up and down movement with respect to said first frame;

a second outer supporting frame adapted for attachment to a land vehicle;

pivot means for pivotally mounting said first frame to said outer supporting frame for swinging movement about a generally horizontal pivot axis extending transversely with respect to a vehicle;

said pivot axis extending through said seismic energy generating assembly at about the center of gravity thereof;

a vertical guide means positioned on opposite sides of said first frame;

said first frame being movably mounted with respect to said vertical guide means for vertical movement with respect thereto;

lift means coupled to said first frame for producing said vertical movement thereof with respect to said vertical guide means;

said pivot means interconnecting said outer supporting frame and said vertical guide means; and means for limiting the angular extent of said swinging movement of said vertical guide means, said means for limiting the swing of said vertical guide means including an element extending from one of said vertical guide means and said outer supporting frame; and a member on the other of said vertical guide means and outer supporting frame, said member defining an arcuate track for receiving said element, and said element moving along said arcuate track with swinging movement of said vertical guide means but being stopped by said track at the ends thereof for limiting the extent of swing of said vertical guide means.

6. An elevator mounting for mounting a land seismic energy source to a land vehicle, said land seismic energy source being of the type having a seismic energy generating assembly including a seismic energy generator for generating a seismic energy impulse, said generator being supported in a cage-like frame and being adapted for vertical movement within said cage-like frame in reaction to transmission of a powerful seismic energy impulse down into the earth, said elevator mounting comprising:

an outer supporting frame adapted for mounting on said land vehicle;

vertical guide means for guiding said cage-like frame in vertical movement relative to said outer supporting frame;

said vertical guide means being pivotally mounted to said outer supporting frame for swinging movement about a horizontal axis extending transversely with respect to the vehicle for accommodating ground surface sloping fore and aft with respect to the vehicle;

said vertical guide means including two rigid, tubular, linear channel members each having a longitudinally extending opening therein facing inwardly toward said seismic energy generating assembly;

said seismic energy generating assembly including horizontal extensions which fit into said tubular channel members and are free to move longitudinally along within said channel members;

said horizontal extensions from said generating assembly extending through said longitudinal openings;

said extensions including removable slide bearing sleeves at least partially surrounding vertical cylindrical mandrels positioned within and coaxial with said tubular channel members;

said tubular channel members each being pivotally mounted to said outer supporting frame by means of spherical self-aligning bearing;

swing-limiting means acting in sliding relationship between the upper end of each of said tubular channel members and said outer supporting frame for limiting the fore and aft swinging movement of said seismic energy generating assembly;

said swing-limiting means each including a slide surface extending fore and aft and mounted on one of said upper end or said outer supporting frame and at least one slide pad mounted on the other of said upper end and said outer supporting frame and pressing firmly against said slide surface in sliding relationship therewith for preventing the tubular channel member from turning about its own axis; and lifting means connected to said cage-like frame for lifting said cage-like frame along a straight path parallel with said vertical guide means to move said seismic energy generating assembly from an operating position in contact with the ground to an elevated position above the ground in readiness for transport, said lifting means also lowering said cage-like frame along a straight path parallel with said pivotally mounted vertical guide means for moving said cage-like frame down straight parallel with said vertical guide means even when said vertical guide means is swung into a tipped position for accommodating such sloping ground surface, whereby said elevator mounting enables convenient lifting of said seismic energy generating assembly for transport from shot point to shot point and enables the pressing of said seismic energy generating assembly flush down against ground surface sloping fore and aft with respect to said land vehicle.

7. An elevator mounting for mounting a land seismic energy source to a land vehicle, said land seismic energy source being of the type having a seismic energy generating assembly including a seismic energy generator for generating a seismic energy impulse, said generator being supported in a cage-like frame and being adapted for vertial movement within said cage-like frame in reaction to transmission of a powerful seismic energy impulse down into the earth, said elevator mounting comprising:

an outer supporting frame adapted for mounting on said land vehicle;

vertical guide means for guiding said cage-like frame in vertical movement relative to said outer supporting frame;

said vertical guide means being pivotally mounted to said outer supporting frame for swinging movement about a horizontal axis extending transversely with respect to the vehicle for accommodating ground surface sloping fore and aft with respect to the vehicle;

said vertical guide means including two rigid, tubular, linear channel members each having a longitudinally extending opening therein facing inwardly toward said seismic energy generating assembly;

said seismic energy generating assembly including horizontal extensions which fit into said channel members and are free to move longitudinally along within said channel members;

said horizontal extensions from said generating assembly extending through said longitudinal openings;

said extensions including removable slide bearing sleeves at least partially surrounding vertical cylindrical mandrels positioned within and coaxial with said tubular channel members;

said removable slide bearing sleeves each having an outer diameter greater than the width of the longitudinally extending opening in the tubular channel member, whereby the bearing sleeve in normal position is captured within the channel in the tubular member in longitudinal sliding fit relationship therein, and the removable slide bearing sleeve is C-shaped as seen in cross section, whereby each slide bearing sleeve can be conveniently removed by sliding it axially off from the mandrel and then by turning it approximately 90° within the channel for enabling it to be removed through said longitudinally extending opening; and lifting means connected to said cage-like frame for lifting said cage-like frame along a straight path parallel with said vertical guide means to move said seismic energy generating assembly from an operating position in contact with the ground to an elevated position above the ground in readiness for transport, and said lifting means also lowering said cage-like frame along a straight path parallel with said pivotally mounted vertical guide means for moving said cage-like frame down straight parallel with said vertical guide means even when said vertical guide means is swung into a tipped position for accommodating such sloping ground surface, whereby said elevator mounting enables convenient lifting of said seismic energy generating assembly for transport from shot point to shot point and enables the pressing of said seismic energy generating assembly flush down agains ground surface sloping fore and aft with respect to said land vehicle.

8. In a mobile land seismic energy source for transmitting powerful seismic energy impulses down into the earth wherein a seismic energy generating assembly has a relatively large bottom area intended to be seated down flush against the earth surface for providing a relative large area of firm contact with the earth surface for transmitting said powerful impulses into the earth, improved mounting apparatus comprising:

an outer supporting frame adapted for mounting on a land vehicle;

vertical parallel guide means for guiding said seismic energy generating assembly in vertical movement relative to said outer supporting frame;

said vertical guide means maintaining said generating assembly in parallel relationship with said guide means;

said vertical guide means being pivotally mounted to said outer supporting frame for swinging movement about a generally horizontal axis extending transversely with respect to the vehicle;

said vertical guide means comprising two rigid, linear channel members, said seismic energy generating assembly including horizontal extensions which fit into said channel members and are free to move longitudinally along within said channel members, and lifting means for lifting said generating assembly relative to said vertical guide means to elevate said seismic energy generating assembly from an operating position in contact with the ground to a raised position above the ground in readiness for transport.

9. An elevator mounting for mounting a land seismic energy source to a land vehicle, said land seismic energy source being of the type having a seismic energy generating assembly including a seismic energy generator for generating a seismic energy impulse, said generator being supported in a cage-like frame and being adapted for vertical movement within said cage-like frame in reaction to transmission of a powerful seismic energy impulse down into the earth, said elevator mounting comprising:

an outer supporting frame adapted for mounting on said land vehicle, vertical guide means for guiding said cage-like frame in vertical movement relative to and parallel to said outer supporting frame, said vertical guide means being pivotally mounted to said outer supporting frame for swinging movement about a horizontal axis extending transversely with respect to the vehicle for accommodating ground surface sloping fore and aft with respect to the vehicle, said vertical guide means comprising two rigid, linear channel members, said seismic energy generating assembly including horizontal extensions which fit into said channel members and are free to move longitudinally along within said channel members, lifting means connected to said cage-like frame for lifting said cage-like frame along a straight path parallel with said vertical guide means to move said seismic energy generating assembly from an operating position in contact with the ground to an elevated position above the ground in readiness for transport, and said lifting means also lowering said cage-like frame along a straight path parallel with said pivotally mounted vertical guide means for moving said cage-like frame down straight parallel with said vertical guide means even when said vertical guide means is swung into a tipped position for accommodating such sloping ground surface, whereby said elevator mounting enables convenient lifting of said seismic energy generating assembly for transport from shot point to shot point and enables the pressing of said seismic energy generating assembly flush down against ground surface sloping fore and aft with respect to said land vehicle.

10. An elevator mounting for a land seismic energy source as claimed in claim 9 wherein:

said channel members are tubular members each having a longitudinally extending opening therein facing inwardly toward said seismic energy generating assembly, said horizontal extensions from said generating assembly extend through said longitudinal openings, and said extensions include removable slide bearing sleeves at least partially surrounding vertical cylindrical mandrels positioned within and coaxial with said tubular channel members.

11. In a mobile land seismic energy source for surveying on the earth by transmitting powerful seismic energy impulses down into the earth wherein a seismic energy generator has a relatively large area bottom intended to be seated down flush against the earth surface for providing a relatively large area of firm contact with the earth surface for achieving good coupling with the earth to transmit powerful seismic impulses into the earth and the seismic generator is supportable from a vehicle so that the generator can be raised away from the earth surface for transport, improved mounting apparatus comprising:

a supporting frame means adapted for mounting to a vehicle, said supporting frame means including two arms extending on opposite sides of said seismic energy generator;

double-acting elevator means connected to opposite sides of said seismic energy generator for lifting and lowering said seismic energy generator away from the earth surface and for pressing said large area bottom down forcefully against the earth surface, a pair of bearing assemblies mounted on said arms respectively on opposite sides of said seismic generator and each connected to said elevator means for defining a pivot axis extending transversely with respect to the vehicle about which said elevator means and said seismic generator can swing into an inclined fore or aft position as an assembly with respect to the vehicle, swing-limiting means associated with said supporting frame means and positioned at a higher elevation than said bearing assemblies and being coupled to said seismic generator for limiting the amount of fore or aft swinging movement thereof about said transversely extending axis, said double-acting elevator means including a pair of parallel upright guides positioned respectively on opposite sides of said seismic generator and coupled to said seismic generator for maintaining the lifting-and-lowering line of action of said elevator means perpendicular to the large area bottom surface regardless of the inclined fore or aft position of said assembly about said transversely extending axis for enabling said large area bottom surface to be pressed down firmly against the earth by said elevator means always acting in a direction perpendicular to said large area bottom surface at all inclined positions thereof, whereby a survey crew using said mobile land seismic energy source can conveniently transport said source from shot point to shot point and can reliably press the bottom down firmly and flush against the earth surface for achieving good coupling with the earth regardless of the fact that the earth surface may be sloped in two geographic coordinate directions at the shot point and can reliably operate the seismic energy source even when it is simultaneously inclined in two directions at such a shot point.

12. In a mobile land seismic energy source, improved mounting apparatus as claimed in claim 11, in which:

said pair of bearing assemblies is connected between said arms and said pair of parallel guides respectively, and said elevator means includes a pair of double-acting hydraulic lift cylinders each with a piston rod extending therefrom, each hydraulic cylinder and piston rod being interconnected between the top of a respective one of said upright parallel guide means and said seismic source.

13. In a mobile land seismic energy source, improved mounting apparatus as claimed in claim 11 or 12, in which:

said bearing assemblies define a pivot axis extending horizontally and transversely with respect to the length of the vehicle, and said pivot axis extends through said seismic energy generating assembly at approximately but not below the center of gravity thereof.

14. In a mobile land seismic energy source, improved mounting apparatus as claimed in claim 11 or 12, in which:

said bearing assemblies are spherical, self-aligning bearings.

15. In a mobile land seismic energy source, improved mounting apparatus as claimed in claim 13, in which:

said bearing assemblies are spherical, self-aligning bearings.

* * * * *